(12) United States Patent
Walch

(10) Patent No.: US 8,020,364 B2
(45) Date of Patent: Sep. 20, 2011

(54) HAYMAKING MACHINE WITH A CENTRAL PROTECTOR

(75) Inventor: Martin Walch, Dettwiller (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 12/435,091

(22) Filed: May 4, 2009

(65) Prior Publication Data

US 2009/0277150 A1 Nov. 12, 2009

(30) Foreign Application Priority Data

May 6, 2008 (FR) ...................................... 08 52993

(51) Int. Cl.
*A01D 67/00* (2006.01)
(52) U.S. Cl. ........................................... 56/320.1; 56/1
(58) Field of Classification Search ........... 56/6, 16.4 R, 56/15.2, 320.1, 17.4, 320.2
See application file for complete search history.

(56) References Cited

U.S. PATENT DOCUMENTS

| | | | | |
|---|---|---|---|---|
| 2,743,567 | A | * | 5/1956 | Martin ................. 56/6 |
| 3,014,326 | A | * | 12/1961 | Murray ................. 56/1 |
| 3,027,701 | A | * | 4/1962 | Campbell ............. 56/157 |
| 3,053,033 | A | * | 9/1962 | Maguire ............... 56/13.6 |
| 3,118,264 | A | * | 1/1964 | Barnes ................. 56/1 |
| 3,306,015 | A | * | 2/1967 | Myers ................... 56/12.7 |
| 3,369,350 | A | * | 2/1968 | Rogers et al. ......... 56/11.9 |
| 3,699,755 | A | * | 10/1972 | Hauser ................ 56/16.4 R |
| 4,719,742 | A | * | 1/1988 | Ermacora et al. .... 56/16.4 R |
| 5,005,344 | A | * | 4/1991 | McCracken ........... 56/14.7 |
| 5,279,100 | A | * | 1/1994 | Pruitt et al. ............ 56/1 |
| 5,331,794 | A | * | 7/1994 | Reichle ................. 56/17.4 |
| 5,417,042 | A | | 5/1995 | Walch et al. |
| 5,423,165 | A | | 6/1995 | Walch et al. |
| 5,507,136 | A | | 4/1996 | Walch |
| D379,822 | S | * | 6/1997 | Kishi .................... D15/17 |
| 5,727,371 | A | * | 3/1998 | Kieffer et al. ......... 56/6 |
| 5,749,390 | A | | 5/1998 | Ermacora et al. |
| 5,765,348 | A | * | 6/1998 | Thagard et al. ....... 56/15.2 |
| 5,794,424 | A | | 8/1998 | Ermacora et al. |
| 5,901,533 | A | | 5/1999 | Ermacora et al. |
| 5,901,537 | A | | 5/1999 | Walch et al. |
| 5,966,913 | A | * | 10/1999 | Neuerburg ............. 56/16.4 R |
| 5,992,133 | A | | 11/1999 | Walch et al. |
| 6,003,291 | A | | 12/1999 | Ermacora et al. |
| 6,055,800 | A | | 5/2000 | Walch |
| 6,085,501 | A | | 7/2000 | Walch et al. |
| 6,101,796 | A | | 8/2000 | Wattron et al. |
| 6,158,201 | A | * | 12/2000 | Pruitt et al. ............ 56/6 |
| 6,189,306 | B1 | | 2/2001 | Walch |
| 6,205,752 | B1 | * | 3/2001 | Hess et al. ............. 56/6 |
| 6,269,619 | B1 | | 8/2001 | Walch et al. |
| 6,308,504 | B1 | | 10/2001 | Walch et al. |
| 6,334,292 | B1 | | 1/2002 | Walch et al. |

(Continued)

FOREIGN PATENT DOCUMENTS

DE 84 07 525.2 6/1984

(Continued)

*Primary Examiner* — Arpad Fabian-Kovacs
(74) *Attorney, Agent, or Firm* — Oblon, Spivak, McClelland, Maier & Neustadt, L.L.P.

(57) ABSTRACT

A haymaking machine hitched to a tractor, including a frame carrying a cutting mechanism having cutting tools and a carrying structure intended to support a protective device, said protective device including one central protector articulated on said carrying structure by means of one connecting rod.

16 Claims, 4 Drawing Sheets

U.S. PATENT DOCUMENTS

| | | |
|---|---|---|
| 6,381,935 B1 | 5/2002 | Wattron et al. |
| 6,427,428 B1 | 8/2002 | Ermacora et al. |
| 6,447,889 B2 * | 9/2002 | Kulkaski .................. 428/212 |
| 6,612,102 B2 | 9/2003 | Walch et al. |
| 6,668,531 B2 | 12/2003 | Wattron et al. |
| 6,679,038 B2 | 1/2004 | Walch et al. |
| 7,024,845 B2 * | 4/2006 | Kallevig et al. ............ 56/17.4 |
| 7,185,479 B1 * | 3/2007 | Cartner ..................... 56/320.1 |
| 7,337,599 B2 * | 3/2008 | Wilhelm .................. 56/16.4 R |
| 7,356,982 B2 * | 4/2008 | Barnett ...................... 56/153 |
| 7,469,525 B2 * | 12/2008 | Zeigler et al. ............ 56/320.1 |
| 7,555,886 B2 * | 7/2009 | Gradoz et al. ............... 56/119 |
| 7,644,567 B2 * | 1/2010 | Blakeslee et al. .......... 56/17.3 |
| 2006/0254242 A1 | 11/2006 | Halter et al. |
| 2007/0204587 A1 * | 9/2007 | Rosenbalm et al. ........ 56/119 |

FOREIGN PATENT DOCUMENTS

| | | |
|---|---|---|
| DE | 197 18 110 A1 | 11/1998 |
| EP | 0 310 532 | 4/1989 |
| FR | 2 562 758 | 10/1985 |

* cited by examiner

HAYMAKING MACHINE WITH A CENTRAL PROTECTOR

BACKGROUND OF THE INVENTION

1. Field of the Invention

The present invention relates to the general technical field of agricultural machinery and in particular to a haymaking machine that can be hitched to a tractor and comprises a frame carrying a cutting mechanism comprising cutting tools and a carrying structure intended to support a protective device, said protective device consisting of at least one central protector.

2. Discussion of the Background

Haymaking machines are for example cutting machines of the rotary mower, mower-crusher with one or more vertical axes or with horizontal axis type. Known rotary mowers comprise a cutting mechanism with cutting tools in the form of disks or drums. These disks or drums cut standing product, for example grass, by means of rotary knives rotating at high speed. The mowers are protected in order to prevent any contact with the rotating cutting tools at the front, at the rear, at the sides and at the top. The protective device masks the cutting tools and prevents earth and even stones being thrown out. The protective device therefore comprises at least one central protector, at least one rear protector and a side protector on either side. During work, the knives wear and may also be damaged by an obstacle. A conventional maintenance operation is therefore the replacement of these knives. This operation is usually carried out when the cutting mechanism is clear of the ground, which makes the work easier.

Such a machine is, for example, a trailed mower-conditioner. This mower comprises a cutting mechanism connected to a frame which rests on the ground via wheels. It is hitched to a tractor via a drawbar which is connected to the frame and which extends at least partially above the cutting mechanism. The drawbar carries drive members enabling the tools of the cutting mechanism to rotate. The cutting mechanism comprises a carrying structure and a protective device. The carrying structure supports the protective device and the latter covers the cutting mechanism. The protective device comprises a central protector which protects the portion in front of and the portion above the cutting tools. Regulations lay down a minimum distance for this central protector above and in front of the cutting tools.

To gain access to the cutting tools and make maintenance work easier, the central protector is moved away. On this machine, the central protector is connected to the carrying structure by means of an articulation with a substantially horizontal axis that is perpendicular to the direction of travel. This articulation extends above the cutting mechanism. The movement away is therefore carried out by pivoting about this articulation. When the cutting mechanism is moved away from the ground, it can be noted that the articulation is arranged in the vicinity of the drawbar and of the transmission member and that it is therefore no longer possible to pivot the central protector about the articulation. The central protector is therefore moved away starting from the work position when the cutting mechanism is close to the ground. This condition requires the user to carry out various actions. Thus, he has to get down from the tractor, move away the central protector by pivoting it about the articulation, then he has to get back into the tractor, move the cutting mechanism away from the ground and finally he must get down again from the tractor to carry out the maintenance operation. When the latter is complete, the user carries out the procedure described above in reverse so that the mower is again operational. It can therefore be seen that to gain access to the cutting tools is a tiresome operation requiring getting on and off the tractor many times and is costly in time.

On another machine, the central protector is moved away by pivoting it about an articulation with a substantially vertical axis. The vertical articulation is arranged in front and at one end of the central protector. The pivoting is carried out manually by raising the central protector via the other end. It is possible to move the central protector fully away only when the drawbar extends laterally or is moved away to one side in the case of a central drawbar. The moved end of the central protector is supported by a stand. The central protector is swung open when the cutting mechanism is close to the ground. In this position close to the ground, the opening of the central protector is made easier, however the user does not enjoy optimal conditions for replacing the knives.

SUMMARY OF THE INVENTION

It is an object of the present invention to overcome the aforementioned drawbacks by proposing a machine with an improved central protector allowing rapid, easy and ergonomical access to the tools of the cutting mechanism.

Accordingly, an important feature of the invention consists in that said central protector is articulated on said carrying structure by means of at least one connecting rod. In this way, access to the cutting mechanism is easy and the working conditions for maintenance operations are improved.

According to another important feature of the invention, the central protector is moved in a combined rotation and translation movement. Thanks to this combined movement, the central protector is moved away with a minimum of overhead space requirement.

BRIEF DESCRIPTION OF THE DRAWINGS

Other features and advantages of the invention will emerge from the following claims and description of the nonlimiting exemplary embodiment of the invention with reference to the appended drawings in which:

DESCRIPTION OF THE PREFERRED EMBODIMENTS

Figure 1:
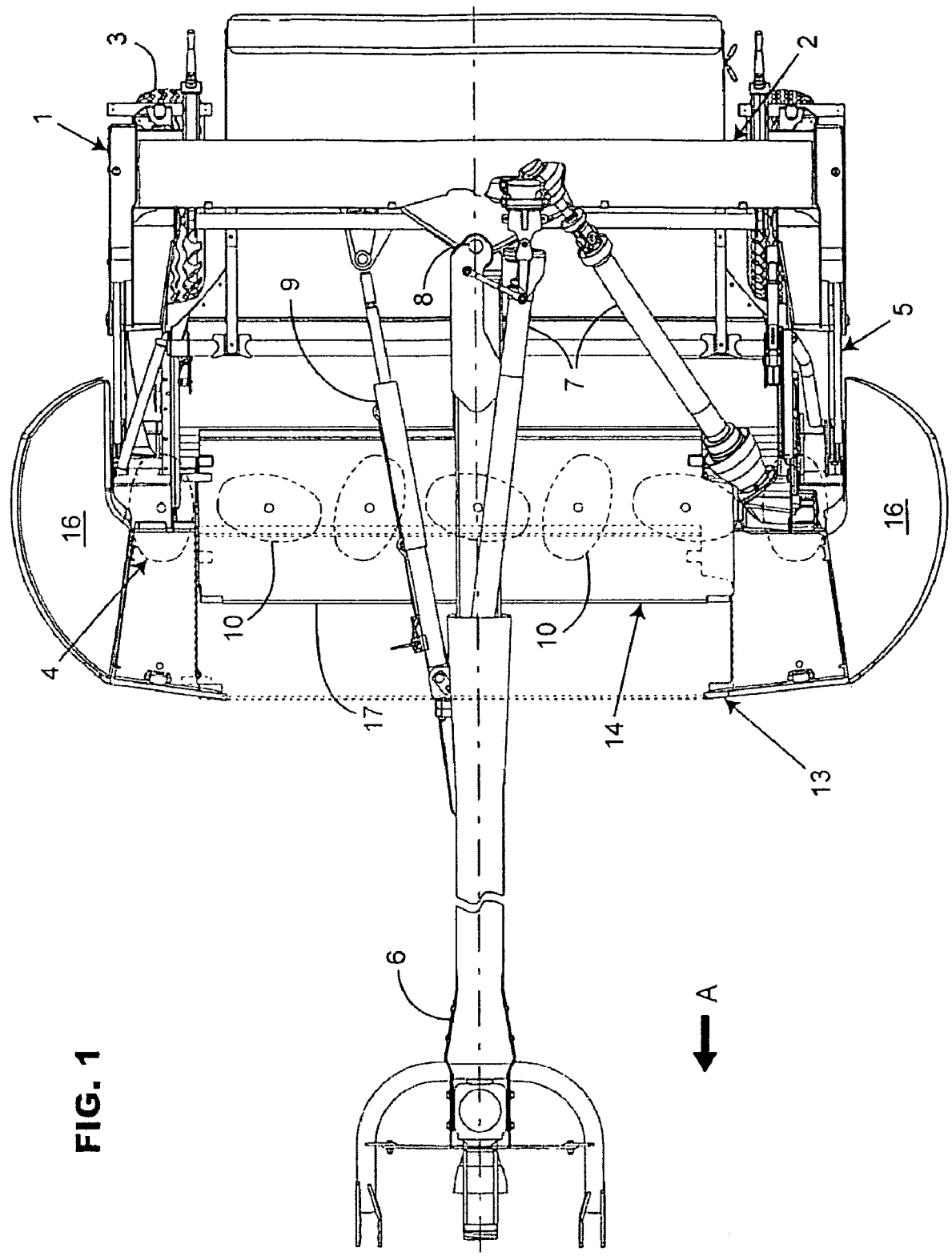
FIG. 1 represents a top view of the haymaking machine according to the invention.

As represented in the figures, the haymaking machine 1 is pulled in a direction of travel A. In the rest of the description, the concepts "front" and "rear", "in front of" and "behind" are defined with reference to the direction of travel A and the concepts of "right" and "left" are defined when looking at the machine from the rear in the direction of travel A. It comprises a frame 2 traveling along the ground by means of two wheels 3. The frame 2 supports a cutting mechanism 4 by means of a suspension device 5. The frame 2 is connected to the rear of a tractor (not shown) by means of a drawbar 6. The total length of the drawbar 6 is not shown in the figures. The drawbar 6 is also used to drive the cutting mechanism 4, from the power take-off of the tractor, by means of transmission members 7.

The drawbar 6 is connected to the frame 2 by means of an articulation 8 with an axis directed upward. The articulation 8 advantageously allows the machine 1 to occupy, relative to the tractor, a transport position and at least one work position. In the light of FIG. 1, the articulation 8 is situated at least substantially in a vertical midplane of the machine 1. The machine 1 is arranged in line with the tractor for transport (FIG. 1), whereas it is offset to the side relative to the tractor during work. The position of the frame 2 relative to the drawbar 6 may be modified with the aid of a hydraulic cylinder 9. By pivoting the drawbar 6 relative to the frame 2 about the articulation 8, the machine 1 may be moved to the right or to the left of the tractor. These two positions, used in work, allow the machine 1 to work going to and fro.

The cutting mechanism 4 is intended to cut standing product; for this it has cutting tools 10. In the example shown, the cutting tools 10 are disks provided on their periphery with cutting tools such as knives 11. The cutting tools 10 are arranged one beside the other in a line at least substantially perpendicular to the direction of travel A. Each cutting tool 10, represented symbolically in FIG. 1, is driven in rotation about an upwardly directed respective axis via the transmission members 7. During work, the cutting mechanism 4 rests at least substantially on the ground and must follow the relief of the terrain in order to ensure a good cut. Thanks to the suspension device 5 the cutting mechanism 4 is capable of following the unevennesses of the ground independently of the frame 2.

The cutting mechanism 4 comprises a carrying structure 12. It is connected to the cutting mechanism 4 by means of two side walls extending downward. The carrying structure 12 extends above the cutting mechanism 4. It is intended to support a protective device 13 which surrounds the cutting mechanism 4. The protective device 13 is intended on one hand to prevent accidental access to the cutting tools 10 in order to prevent accidental injuries and on another hand to prevent objects such as stones for example being thrown out. The protective device 13 therefore comprises at least one central protector 14, at least one rear protector 15 and a side protector 16 on either side. The central protector 14 protects in particular the portion in front of and the portion above the cutting tools 10. To complete this protection, the side protectors 16 extend on either side of the cutting mechanism 4 and the rear protector 15 extends behind the cutting mechanism 4. Therefore the cutting tools 10 are perfectly masked by the protective device 13.

The haymaking machine 1 represented in the figures is a mower-conditioner. The cutting mechanism 4 is therefore supplemented by a treatment device 27 intended to accelerate the drying of the cut product. This treatment device 27 extends to the rear of the cutting mechanism 4. In this case, the rear protector 15 is arranged behind the treatment device 27.

Figure 2:
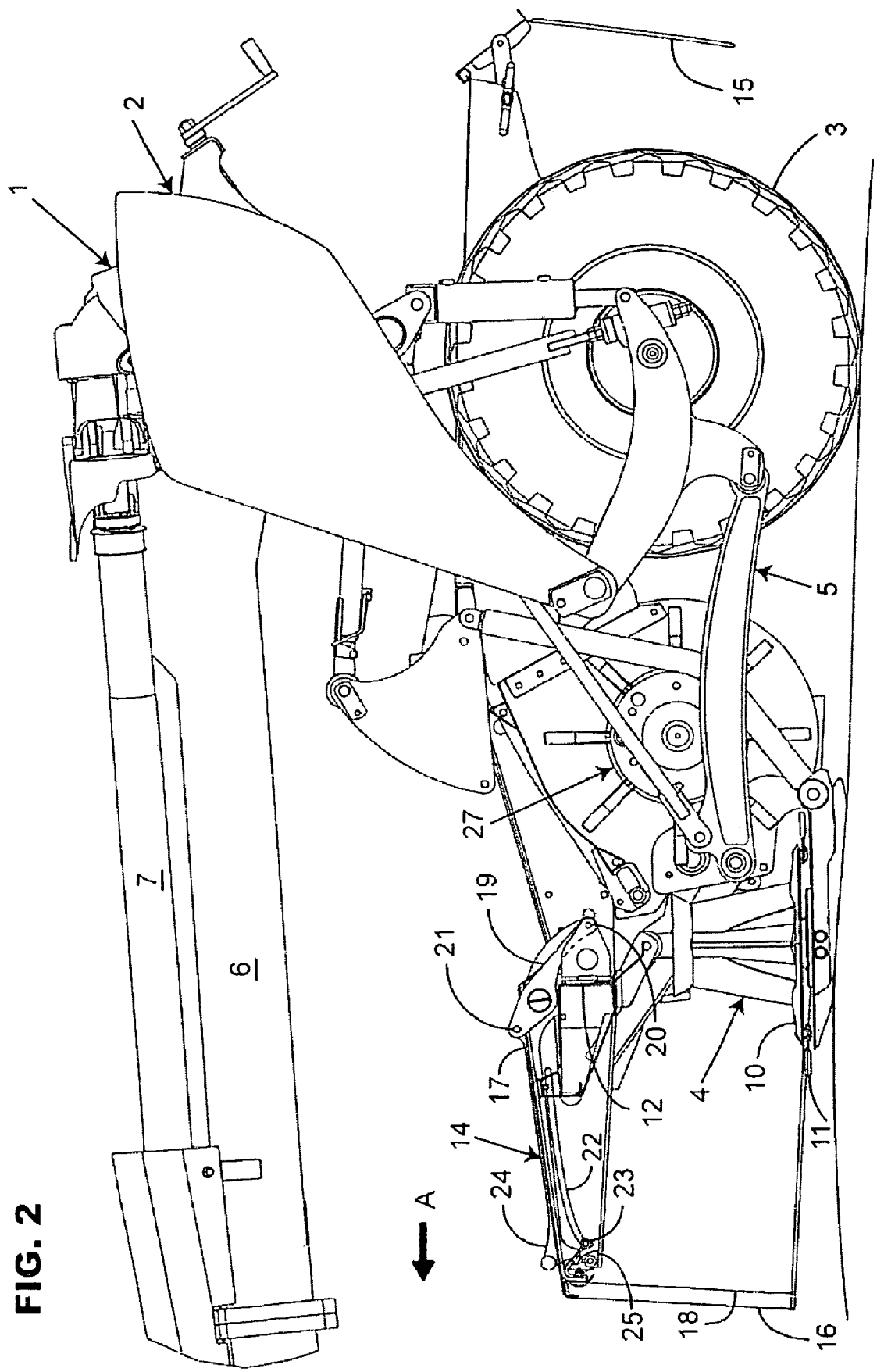
FIG. 2 represents a side view of the machine in the working position.

FIG. 2 illustrates, in a side view, the machine 1 in a work position in which the cutting mechanism 4 is close to the ground. The central protector 14 extends substantially above the cutting tools 10 and substantially in front with reference to the direction of travel A. The central protector 14 comprises two portions: a top portion 17 and a front portion 18. The top portion 17 extends substantially horizontally and at least substantially in front of the cutting tools 10. The top portion 17 is relatively rigid and thereby allows the user to gain access to the transmission members 7 at the frame 2. The carrying structure 12 which carries the top portion 17 has reinforcements in the region over which the user has to pass, if necessary. According to another exemplary embodiment, the top portion 17 is a canvas preventing objects being thrown out. The front portion 18 is, for its part, mounted at the front of the top portion 17 in the direction of travel A. It extends at least substantially vertically downward to the vicinity of the cutting tools 10 during work. The front portion 18 makes it possible in particular to absorb the kinetic energy of flying objects that are thrown sideways by the cutting mechanism 4. This front portion 18 is flexible and usually consists of a rubber canvas.

Figure 3:
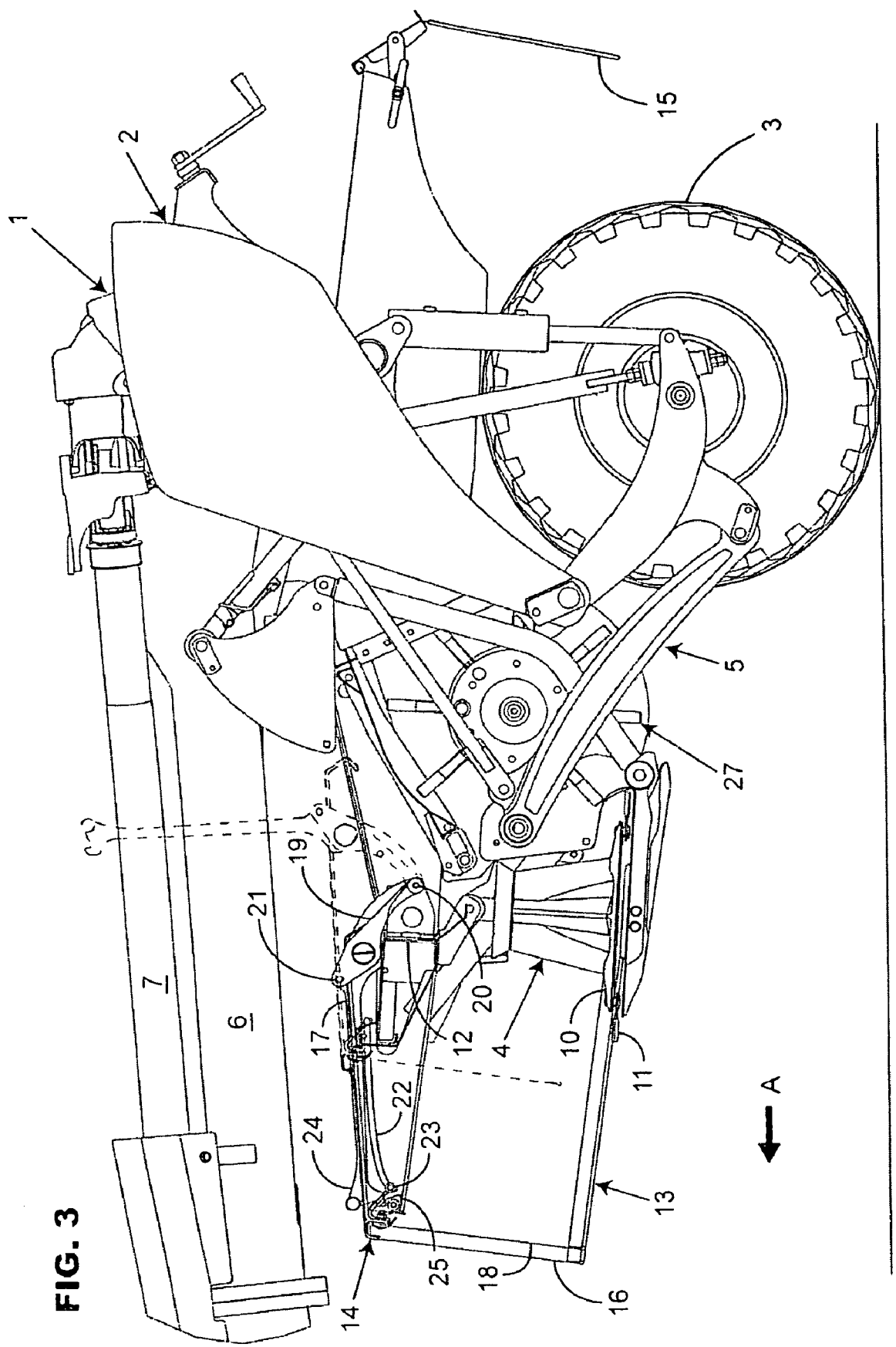
FIG. 3 represents a side view of the machine in the raised transport position.

FIG. 3 represents, in a side view, the machine 1 in its transport position. In this position, the cutting mechanism 4 is distant from the ground; it lies at a certain height above the ground. Maintenance operations are advantageously carried out in this position. The user therefore has an ergonomical position for replacing the knives. Moving the central protector 14 away allows better access to the cutting mechanism 4. Alternatively, the cutting mechanism 4 may be checked from the work position.

According to an important feature of the invention, the central protector 14 is articulated on the carrying structure 12 by means of at least one connecting rod 19. Thanks to this connecting rod 19, access to the cutting mechanism 4 is rapid, practical and the conditions for carrying out the maintenance operations are ergonomical. This connecting rod 19 is connected at one of its ends to the carrying structure 12 via a lower articulation 20 with a substantially horizontal axis that is perpendicular to the direction of travel A. The other end of the connecting rod 19 is connected to the central protector 14 via an upper articulation 21 with a substantially horizontal axis that is perpendicular to the direction of travel A. In the light of FIG. 1, it can be noted that the width of the central protector 14 allows convenient access to all the tools 10 of the cutting mechanism 4. In this figure, the central protector 14 is represented on one hand by continuous lines in its open position for maintenance and on another hand in its closed position for work with broken lines.

In a particularly advantageous manner, the central protector 14 is moved in a combined rotation and translation movement relative to the lower articulation 20. With reference to the direction of travel A, the central protector 14 is moved away rearward relative to the cutting mechanism 4. This movement away is carried out with a minimum of overhead space requirement. The central protector 14, of FIG. 3, is shown in two positions. A closed position shown in continuous lines and an open position shown in broken lines. During work, the central protector 14 must always be in the closed position for safety while during maintenance the central protector 14 is open to facilitate access to the cutting mechanism 4.

In the exemplary embodiment shown, the lower articulation 20 extends substantially beneath the upper articulation 21 and substantially rearward of the carrying structure 12. The upper articulation 21 extends above the central protector 14 and in the vicinity of its rear end with reference to the direction of travel A. When the central protector 14 is opened or closed, the upper articulation 21 moves from a position at the front to a position at the rear relative to the lower articulation 20. The central protector 14 is moved away rearward about the lower articulation 20 manually. In another embodiment, the lower articulation 20 could be placed at the front of the carrying structure 12 and the upper articulation 21 would then be placed in the vicinity of the front end of the central protector 14.

Figure 4:
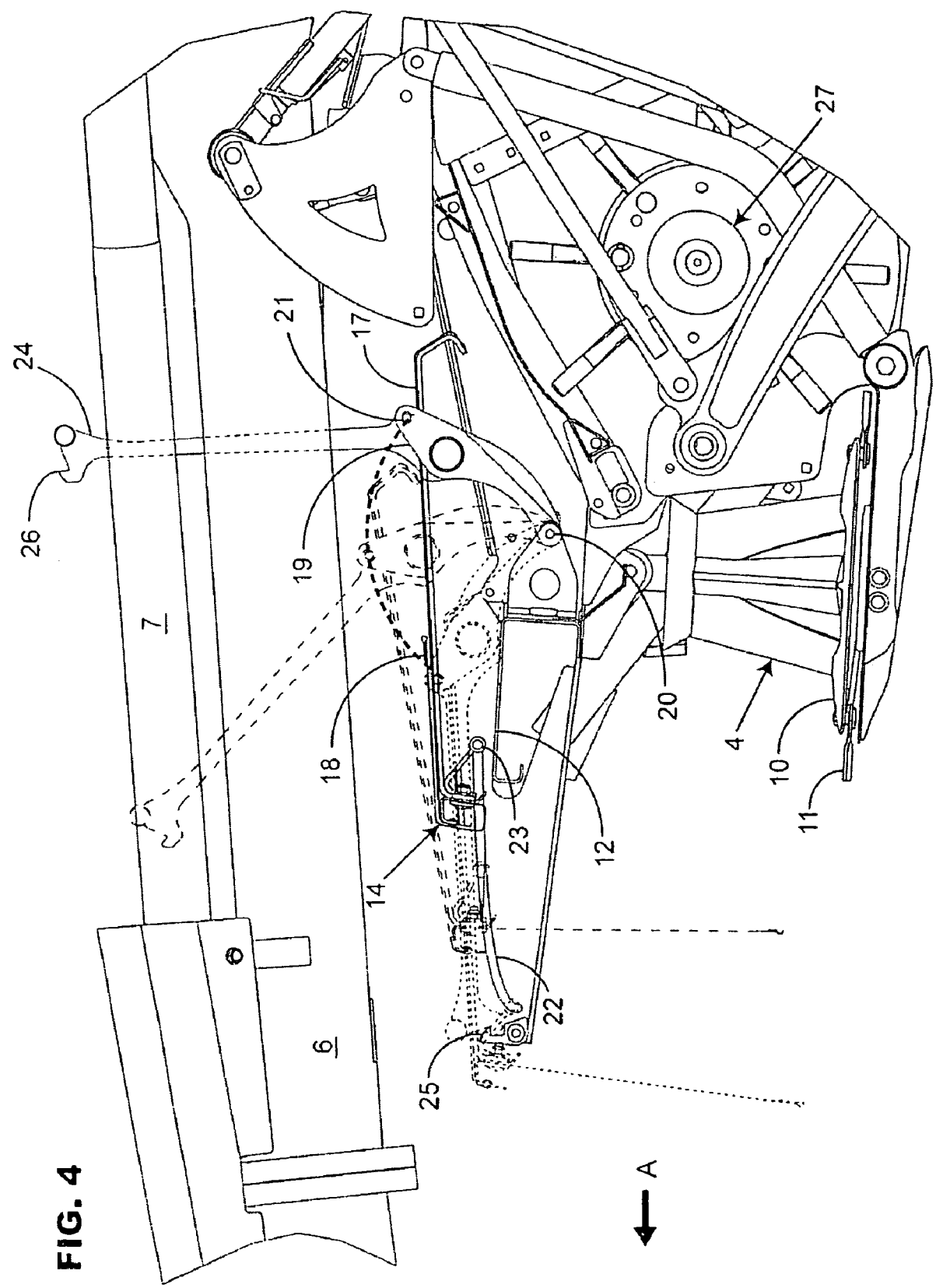
FIG. 4 is a side view on a larger scale of FIG. 3.

FIG. 4 represents in greater detail a portion of the machine 1 with the cutting mechanism 4 moved away from the ground. In this position, the cutting mechanism 4 is placed as close as possible to the drawbar 6. The central protector 14 is shown in three positions which may be differentiated by the style of the lines. The open position is represented in continuous lines. The short broken lines correspond to the closed position and the long broken lines define an intermediate position of the central protector 14. Note that the space available between the drawbar 6 and the cutting mechanism 4 is amply sufficient for moving the central protector 14 away. When the central protector 14 is open, the front portion 18 may be raised onto the top portion 17 to facilitate access to the cutting tools 10.

Depending on the working width of the machine 1, the central protector 14 is made in one or more portions. Each portion then comprises at least one connecting rod 19. During the use of a single connecting rod 19, the latter is arranged at least substantially in the vertical midplane of the central protector 14. In the exemplary embodiment shown, the central protector 14 is connected to the carrying structure 12 by means of two connecting rods 19, one connecting rod 19 being arranged on either side of the central protector 14 in a symmetrical manner relative to the vertical midplane of the machine 1.

During the movement away, the front corners of the central protector 14 are slid on the side protector 16. Alternatively, and according to the example shown, the front portion of the central protector 14 is slid in a groove 22 by means of a lug 23, the lug 23 being connected to the front portion and the groove 22 being arranged in the carrying structure 12. The groove 22 is longitudinal and allows the central protector 14 to be moved away. The guidance of the movement of the central protector 14 is improved thanks to the groove 22. In another alternative, the guidance of the central protector 14 is inverted. Therefore, the connecting rod 19 guides the front portion and the groove 22 and the lug 23 guide the rear portion of the central protector 14. In another exemplary embodiment, the guidance consisting of the groove 22 and the lug 23 is replaced by a connecting rod, one end of which is connected to the carrying structure 12 and the other end to the central protector 14. The central protector 14 is then articulated on the carrying structure 12 by means of two connecting rods. These two connecting rods then advantageously form a quadrilateral.

To make the movement of the central protector 14 easier, it is actuated by at least one lever 24. The lever 24 is therefore connected on one hand to the central protector 14 by means of the upper articulation 21 and is connected on another hand to the carrying structure 12 via the lower articulation 20. It comprises a handle for operation. The lever 24 extends substantially horizontally when the central protector 14 is closed and extends substantially vertically when the central protector 14 is open. In the example shown, the central protector 14 is actuated by a single lever 24. The lever 24 is arranged on one side of the central protector 14.

To prevent the central protector 14 from opening during work, it is locked. The carrying structure 12 therefore comprises a latch 25. The latch 25 extends in the vicinity of the front portion of the top portion 17. In the example shown, the central protector 14 is locked by means of the lever 14. The latter has a stop 26 intended to be immobilized by the latch 25.

It is obvious that the invention is not limited to the embodiments described above and represented in the appended drawings. Modifications remain still possible, particularly with respect to the construction or the number of the various elements or by substitution of technical equivalents, while nevertheless not departing from the field of protection as defined in the following claims.

Note that the invention applies to mower-conditioners with a central drawbar with the articulation arranged substantially in the vertical midplane as in the example shown as well as to mower-conditioners with a side drawbar in which the articulation is arranged on the side.

What is claimed as new and desired to be secured by Letters Patent of the United States is:

1. A haymaking machine configured to be hitched to a tractor, the haymaking machine comprising:
  a frame carrying a cutting mechanism having cutting tools;
  a carrying structure that supports a protective device, the protective device defining an external protective covering of the haymaking machine that surrounds the cutting mechanism to prevent accidental access to the cutting tools and to prevent debris from accidentally being thrown out from the haymaking machine, the protective device including one central protector having an elongated top portion elongated along a direction of travel of the haymaking machine; and
  a connecting rod having one end connected to a lower articulation and another end connected to an upper articulation, the central protector articulated on the carrying structure via the connecting rod between an open position and a closed position, the elongated top portion being movable translationally between the open position and the closed position in a substantially same horizontal orientation.

2. The machine as claimed in claim 1, wherein the lower articulation and the upper articulation each have a substantially horizontal axis that is substantially perpendicular to the direction of travel.

3. The machine as claimed in claim 1, wherein the lower articulation is located beneath the upper articulation and wherein the upper articulation is located above the central protector.

4. The machine as claimed in claim 1, wherein the central protector is moved in a combined rotation and translation movement.

5. The machine as claimed in claim 1, wherein the central protector is moved rearward and above the cutting mechanism.

6. The machine as claimed in claim 1, further including a lug connected to the central protector, wherein
  the carrying structure includes a groove, and
  the movement of the central protector is guided at a rear by the connecting rod and at a front by the lug, the lug being configured to slide in the groove.

7. The machine as claimed in claim 1, wherein the central protector is actuated by a lever.

8. The machine as claimed in claim 1, wherein, during work, the central protector is locked by a latch.

9. The machine as claimed in claim 1, wherein the machine is a cutting machine of the mower type.

10. The machine as claimed in claim 1, wherein the machine is a cutting machine of the mower-conditioner type.

11. The machine as claimed in claim 1, wherein the central protector is arranged substantially horizontally above the cutting tools and in front of the cutting tools, such that the central protector is substantially rearwardly and substantially horizontally movable with respect to the direction of travel via the connecting rod to provide access to the cutting tools.

12. The machine as claimed in claim 7, wherein the lever is connected to the central protector via the upper articulation and the lever is connected to the carrying structure via the lower articulation.

13. The machine as claimed in claim 7, wherein the lower articulation is located on the carrying structure and the upper articulation is located on the central protector.

14. The machine as claimed in claim 1, wherein an internal side of the elongated top portion of the central protector faces downwards toward the cutting tools in both the open position and the closed position.

15. The machine as claimed in claim 14, wherein an internal side of the elongated top portion of the central protector at least partially opposes the cutting tools in both the open position and the closed position.

16. The machine as claimed in claim 1, wherein the central protector further includes a front portion arranged substantially in front of the cutting tools when the central protector is in the closed position.

* * * * *